United States Patent
Feng et al.

(10) Patent No.: US 10,551,712 B2
(45) Date of Patent: Feb. 4, 2020

(54) DISPLAY APPARATUS SWITCHABLE BETWEEN DISPLAY STATE AND MIRROR STATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhipeng Feng, Beijing (CN); Dan Su, Beijing (CN); Zongze He, Beijing (CN); Shuo Li, Beijing (CN); Jianguang Yang, Beijing (CN); Liang Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 170 days.

(21) Appl. No.: 15/527,312

(22) PCT Filed: Oct. 12, 2016

(86) PCT No.: PCT/CN2016/101863
§ 371 (c)(1),
(2) Date: May 16, 2017

(87) PCT Pub. No.: WO2017/181621
PCT Pub. Date: Oct. 26, 2017

(65) Prior Publication Data
US 2018/0252978 A1    Sep. 6, 2018

(30) Foreign Application Priority Data

Apr. 18, 2016 (CN) .......................... 2016 1 0243719

(51) Int. Cl.
G02F 1/163 (2006.01)
G02F 1/155 (2006.01)
(Continued)

(52) U.S. Cl.
CPC ................ G02F 1/163 (2013.01); B60R 1/08 (2013.01); B60R 1/12 (2013.01); G02F 1/155 (2013.01);
(Continued)

(58) Field of Classification Search
CPC . G02F 1/155; G02F 1/15; G02F 1/153; G02F 1/1525; G02F 2001/164;
(Continued)

(56) References Cited

U.S. PATENT DOCUMENTS

2012/0224247 A1* 9/2012 Sotzing ................. H01M 4/624
359/265
2012/0281268 A1* 11/2012 McCabe ................... B60R 1/12
359/267
(Continued)

FOREIGN PATENT DOCUMENTS

CN     1542705 A    11/2004
CN     201273979 Y   7/2009
(Continued)

OTHER PUBLICATIONS

Extended European Search Report dated Nov. 12, 2018, received for corresponding European Application No. 16899205.5.
(Continued)

Primary Examiner — Evan P Dzierzynski
Assistant Examiner — Sharrief I Broome
(74) Attorney, Agent, or Firm — Kinney & Lange, P.A.

(57) ABSTRACT

Disclosed is a display apparatus. The display apparatus comprises a display and a field-induced visibility-controlling layer provided on light-outgoing side of the display,
(Continued)

wherein the field-induced visibility-controlling layer can be switched between a transparent state and a mirror state by adjusting voltage applied, such that when the field-induced visibility-controlling layer is in the transparent state, the display is visible through the field-induced visibility-controlling layer; and when the field-induced visibility-controlling layer is in the mirror state, a mirror shielding the display is formed therein.

17 Claims, 3 Drawing Sheets

(51) Int. Cl.
  *B60R 1/08*  (2006.01)
  *B60R 1/12*  (2006.01)
  *G02F 1/15*  (2019.01)
(52) U.S. Cl.
  CPC ... *B60R 2001/1253* (2013.01); *B60R 2300/20* (2013.01); *G02F 2001/164* (2019.01)
(58) Field of Classification Search
  CPC .. G02F 1/15165; G02F 1/1523; G02F 1/1533; G02F 2001/1536; G02F 2001/15145; G02F 1/163; G02F 1/1503; G02F 1/157; G02F 1/161; G02F 1/1506; G02F 2001/1502; G02F 2001/1552; G02F 2202/36; G02F 1/1508; G02F 2203/02; G02B 2027/0114; G02B 26/004; G02B 27/01; G02B 1/11; G02B 1/113; G02B 1/116; G02B 2027/0112; G02B 2027/012; G02B 27/22; G02B 27/2214; G02B 3/00; G02B 5/02; G02B 5/0242; G02B 5/0247; G02B 5/08; G02B 6/2746
  See application file for complete search history.

(56) References Cited

U.S. PATENT DOCUMENTS

| | | | |
|---|---|---|---|
| 2013/0088856 A1* | 4/2013 | Kim | G02F 1/133553 362/97.1 |
| 2013/0215365 A1* | 8/2013 | Huang | G02F 1/133528 349/96 |
| 2014/0218781 A1 | 8/2014 | Kobayashi et al. | |
| 2015/0021156 A1* | 1/2015 | Inoue | G06F 3/044 200/600 |
| 2015/0042900 A1* | 2/2015 | Chen | G06F 3/044 349/12 |
| 2015/0146276 A1 | 5/2015 | Kim et al. | |
| 2016/0054632 A1* | 2/2016 | Toko | G02F 1/19 359/268 |

FOREIGN PATENT DOCUMENTS

| | | |
|---|---|---|
| CN | 203732850 U | 7/2014 |
| CN | 104614913 A | 5/2015 |
| CN | 105807526 A | 7/2016 |

OTHER PUBLICATIONS

International Search Report and Written Opinion (including English translation of Box V) dated Dec. 30, 2016, for corresponding PCT Application No. PCT/CN2016/101863.

* cited by examiner

US 10,551,712 B2

DISPLAY APPARATUS SWITCHABLE BETWEEN DISPLAY STATE AND MIRROR STATE

CROSS-REFERENCE TO RELATED APPLICATION

The present application claims the priority of Chinese Patent Application No. 201610243719.7 filed on Apr. 18, 2016, entitled with "Display Apparatus Switchable between Display State and Mirror State", the entire content of which is incorporated herein by reference.

TECHNICAL FIELD

The disclosure generally relates to the field of display apparatus, in particular, to a display apparatus switchable between a display state and a mirror state.

BACKGROUND ART

In some cases, a display apparatus switchable between a display state and a mirror state is needed. In other words, it is needed that an image-displaying surface of a display apparatus can, in some cases, turn to a mirror having reflecting function.

A typical one in these cases is an interior rearview mirror in a vehicle. A conventional interior rearview mirror is made of a mirror, by which the driver observes the environment behind the vehicle. However, it is common that passengers, luggage or the like hinder the rear windscreen so that the driver cannot observe the environment behind the vehicle via the interior rearview mirror. This results in inconvenience or even safe problems. Therefore, more and more attention is given to replacement of traditional interior rearview mirrors by display-type interior rearview mirrors.

Generally, observing the environment behind the vehicle by a display-type interior rearview mirror comes into practice by a camera installed at rear of the vehicle. The camera can be installed outside the rear windscreen, so that the field of the vision of the camera will not be blocked.

However, in some cases, a traditional interior rearview mirror is still needed. For instance, when the driver wishes to observe the situation on the back seats via the interior rearview mirror, an interior rearview camera installed outside the vehicle is insufficient to provide this function.

Therefore, for an interior rearview mirror, a display apparatus switchable freely between a mirror state (mirror mode) and a display state is needed. In particular, the mirror mode should have low power consumption. Currently, in commercially available apparatuses, which can achieve that function, a technique using translucent reflective mirror or a technique adding a polarized light-selecting unit and a polarization axis-changeable unit is typically used. These two techniques can hardly achieve bright image and bright mirror, and the power consumption at the mirror state is relatively high.

In the field of the architecture, electrochromic smart windows, which can change the color thereof according to the user's requirement and thus further adjust the sunlight irradiation level smartly, in order to decrease the energy consumption for controlling temperature indoors, have been developed. For example, the patent application CN104614913A discloses a flexible stickable electrochromic device switchable between a mirror state and a transparent state. That device is applied in portholes of an airplane, glass for daylighting, walls of a building, etc.

There is still a need for a display apparatus switchable between a display state and a mirror state.

SUMMARY

In one embodiment of the present disclosure, a display apparatus is provided. The display apparatus comprises a display; and a field-induced visibility-controlling layer provided on light-outgoing side of the display, wherein the field-induced visibility-controlling layer can be switched between a transparent state and a mirror state by adjusting voltage applied, such that when the field-induced visibility-controlling layer is in the transparent state, the display is visible through the field-induced visibility-controlling layer; and when the field-induced visibility-controlling layer is in the mirror state, the display is shielded by the mirror formed of the field-induced visibility-controlling layer.

By means of combining a display and a field-induced visibility-controlling layer which can be electrically switched between a transparent state and a mirror state, a display apparatus switchable freely between a function of displaying an image and a function of mirror is provided. The rapid switch between two states of the field-induced visibility-controlling layer can be achieved by applying an electrical field to a transparent composition to form a mirror layer, and applying a reversed electrical field to the mirror layer to form the transparent composition.

In one embodiment, the field-induced visibility-controlling layer comprises two transparent conductive layers and an electrolyte layer sandwiched therebetween; and a transparent insulating layer is provided between the display and the field-induced visibility-controlling layer; wherein different voltages are applied through the two transparent conductive layers to the electrolyte layer, such that the field-induced visibility-controlling layer is switched between a transparent state and a mirror state.

Here, the display may be formed by a liquid crystal display panel and a back lighting module. The display may also be other displays applicable for the structure of the present disclosure.

In one embodiment, the transparent insulating layer has a thickness of 100-300 μm. For instance, the transparent insulating layer may have a thickness of about 200 μm. Such a thickness not only ensures that there is no interference between the field-induced visibility-controlling layer and the display, but also does not weaken displaying brightness and performance apparently.

In one embodiment, the transparent insulating layer is made of polymethyl methacrylate (PMMA).

In one embodiment, the electrolyte layer is a sol formed by dissolving a silver ion-containing inorganic salt, a brominating agent and a catalyst in an organic solvent. For instance, the silver ion-containing inorganic salt is $AgNO_3$, the brominating agent is tetra-n-butylammonium bromide (TBABr), sodium bromide, potassium bromide or dimethylbromosulfonium bromide, more specifically TBABr, the catalyst is $CuCl_2$, and the organic solvent is DSMO. In one embodiment, the concentration ranges thereof are as follows. $AgNO_3$ concentration is 40-60 mM, TBABr concentration is 200-300 mM, and $CuCl_2$ concentration is 8-12 mM. In one specific embodiment, $AgNO_3$ concentration is about 50 mM, TBABr concentration is about 250 mM, and $CuCl_2$ concentration is about 10 mM.

In one embodiment, the thicknesses of the layers are as follows. The thickness of the transparent conductive layer is 80-120 nm, the thickness of the electrolyte layer is 400-600 μm. And more specifically, the thickness of the transparent conductive layer may be about 100 nm, the thickness of the electrolyte layer may be about 500 μm. Such configuration of layer thicknesses achieves good performance either in the transparent state or in the mirror state.

In one embodiment, the voltage for switching from the transparent state to the mirror state is 1 V to 4 V and the switch time is 2 s or less; and the voltage for switching from the mirror state to the transparent state is −1 V to −4 V and the switch time is 2 s or less. The switch time herein represents the response time required from the beginning of applying voltage to the accomplishment of the switch between the transparent state and the mirror state. Such a combination of the voltage and the switch rate can meet the requirements for rapid switching and for low energy consumption at the same time.

In one embodiment, the display apparatus has a control means allowing the on/off state of the display correspondingly matching the transparent/mirror state of the field-induced visibility-controlling layer. One of the advantages of this kind of control means, which allows the turn-on state of the display matching the transparent state of the field-induced visibility-controlling layer and the turn-off state of the display matching the mirror state of the field-induced visibility-controlling layer, is that energy may be saved.

In one embodiment, the control means allowing the on/off state of the display correspondingly matching the transparent/mirror state of the field-induced visibility-controlling layer includes: a control device automatically turning off or turning on the display according to the mirror state or the transparent state of the field-induced visibility-controlling layer; or, a control device automatically applying an appropriate voltage to change the field-induced visibility-controlling layer into the mirror state or the transparent state when the display is turned off or turned on; or, a circuit, which can manually switch the states of the display and the field-induced visibility-controlling layer at the same time by same switch in a one-touch manner.

In one embodiment, the control means comprises a control module for field-induced visibility-controlling layer and a sensing module, and the control module and a circuit driver of a liquid crystal display module are connected by the sensing module.

In one embodiment, the display apparatus is an interior rearview mirror, which displays an image coming from a camera shooting the environment behind the vehicle or displays a mirror. In one specific embodiment, in the interior rearview mirror, the mirror is not parallel to the light-outgoing surface of the display, such that when the interior rearview mirror is installed in a vehicle, the light-outgoing surface of the display substantially right against a driver, and the mirror is positioned to enable the driver to observe an environment behind the vehicle via the mirror.

DETAILED DESCRIPTION

The disclosure provides a display apparatus, which comprises a display and a field-induced visibility-controlling layer provided on light-outgoing side of the display, wherein the field-induced visibility-controlling layer can be switched between a transparent state and a mirror state by adjusting the applied voltage. When the field-induced visibility-controlling layer is in the transparent state, the observer can watch the image displayed by the display through the transparent field-induced visibility-controlling layer, and the brightness of the image seen is substantially not influenced by the field-induced visibility-controlling layer. Further, when the field-induced visibility-controlling layer is in the mirror state, it forms a bright mirror between the observer and the display, such that the display apparatus serves as a reflective mirror. At this time, the display is invisible for the observer.

Figure 1:
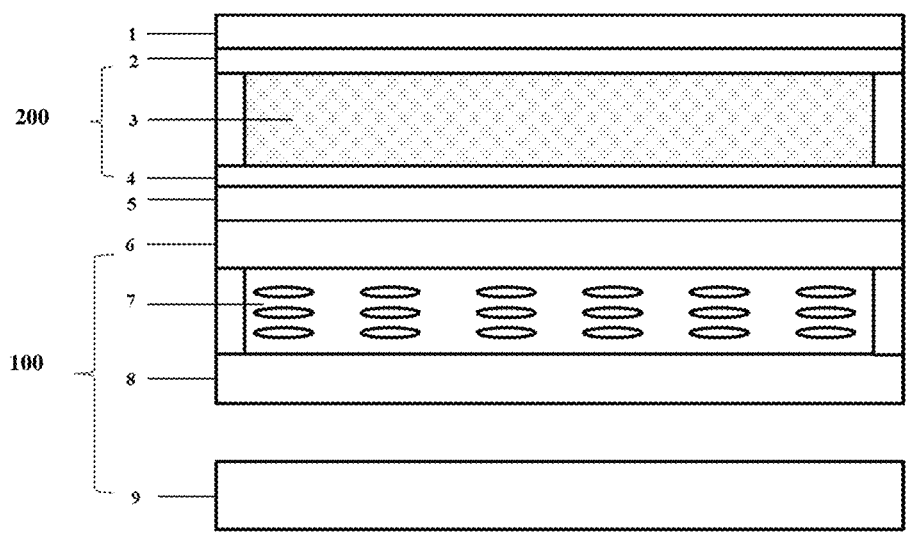
FIG. 1 shows a structure of an example of a display apparatus of the disclosure.

One specific configuration of the display apparatus is as follows. In this exemplary configuration, the display is a liquid crystal display. Those skilled in the art can understand that other displays that do not negatively affect the function of the disclosure can also be used. As shown in FIG. 1, the display 100 comprises a liquid crystal display panel and a back lighting module 9, wherein the liquid crystal display panel comprises a first substrate 6, a second substrate 8 provided oppositely thereto, and a liquid crystal layer 7 sandwiched between the first substrate and the second substrate, and wherein a field-induced visibility-controlling layer 200 is provided on the first substrate (upper substrate) 6, i.e. on the light-outgoing side of the display 100. It should be noticed that the relative size relationship and relative position relationship for respective layers in the drawings are only schematic, not for purpose of limitation.

Figure 4:
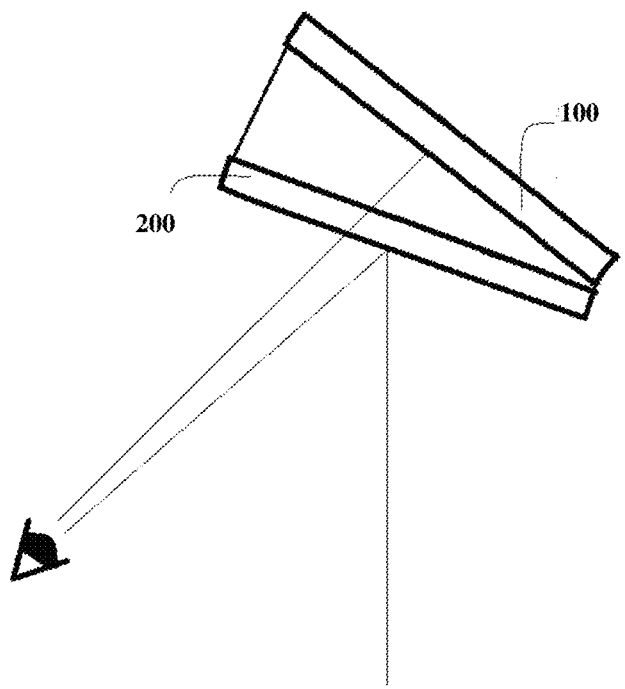
FIG. 4 is a schematic drawing of an example of a display apparatus of the disclosure, in which the light-outgoing surface of the display is not parallel to the mirror.

The relative position of the field-induced visibility-controlling layer 200 with respect to the light-outgoing surface of the display 100 is not limited, as long as the field-induced visibility-controlling layer 200, when it is in the mirror state, can shield the display 100. For instance, when the field-induced visibility-controlling layer 200 is used for a switchable interior rearview mirror, the position of the layer 200 should be adjusted, such that it enables the driver to observe the environment behind the vehicle clearly when it is in the mirror state. At this time, the mirror of the field-induced visibility-controlling layer 200 will not be right against the driver. However, the light-outgoing surface of the display 100 behind the field-induced visibility-controlling layer 200 should be substantially right against the driver, so as to provide an optimal display effect to the driver, in particular, for those display types having a limited angle of view for observation. In other words, for the use in an interior rearview mirror, the field-induced visibility-controlling layer 200 may be not completely parallel to the light-outgoing surface of the display 100, as shown in FIG. 4. By "substantially right against a driver" herein, it means that the driver can watch the display 100 normally. As often occurred in driving practice, the driver may adjust the angle of the mirror slightly, in order to observe better the environment behind the vehicle. At this time, although the angle of the display 100 with respect to the driver may be changed slightly, the display 100 is still substantially right against the driver, as long as the driver can watch the display 100 normally. Of course, the field-induced visibility-controlling layer 200 may also be parallel to the light-outgoing surface of the display 100, in particular in other uses. Those skilled in the art can adjust the specific relative position of the field-induced visibility-controlling layer 200 with respect to the display 100, according to requirements. Additionally, of course, the relative size of the field-induced visibility-controlling layer 200 with respect to the display 100 may also be adjusted specifically, according to the practical requirements for the mirror state and the display state (the transparent state). The field-induced visibility-controlling layer 200 can be fixed to the display 100 by known mechanical connection. The fixing manner is not limited, as long as it does not adversely influence the effect of the present disclosure.

Still as shown in FIG. 1, the field-induced visibility-controlling layer 200 comprises three main parts, i.e. an upper transparent conductive layer 2 and a lower transparent conductive layer 4, and an electrolyte layer 3 sandwiched between the upper transparent conductive layer 2 and the lower transparent conductive layer 4. A transparent insulating layer 5 may be further provided between the liquid crystal display panel and the transparent conductive layer 4. The transparent conductive layer 2 may be covered by a glass substrate 1 thereon. The transparent conductive layers 2, 4 as well as the transparent insulating layer 5 may be formed by physical vapor deposition, such as magnetron sputtering, or by low temperature deposition in CVD manner. The side of the transparent conductive layer 4 against the electrolyte is smooth and intact, so as to facilitate the formation of good mirror thereon. The material of the electrolyte layer 3 may be a sol formed by mixing and dissolving a silver ion-containing inorganic salt (e.g. $AgNO_3$), a brominating agent (e.g. TBABr) and a catalyst (e.g. $CuCl_2$) in an organic solvent (e.g. DMSO, etc.) homogeneously. The periphery of the material of the electrolyte layer is sealed by a sealant. When mixing to form the sol of the visibility-controlling layer, an additive in an appropriate amount may be incorporated, as long as it does not adversely influence the function of the field-induced visibility-controlling layer 200 of the present disclosure. For example, PVB (polyvinyl butyral) may be added optionally, which has the function of semi-curing and makes the electrolyte exhibit a gel state.

As described above, the display 100 may be an ordinary display. When it is necessary to save space, a flat panel display is preferred. A preferable example of the display 100 is a liquid crystal display panel having a back lighting module 9.

The field-induced visibility-controlling layer 200 switches the displaying states by using an electrical field. In order to prevent electrical interference between the display 100 and the field-induced visibility-controlling layer 200, a transparent insulating layer 5 may be provided between the field-induced visibility-controlling layer 200 and the display 100. As shown in FIG. 1, the transparent insulating layer 5 separates the transparent conductive layer 4 of the field-induced visibility-controlling layer 200 from the surface of the display 100, so that the current on the transparent conductive layer 4 is not influenced by the surface of the display 100, and does not influence the surface of the display 100. Thereby a conventional component (such as a glass insulating cover plate) on the surface of the display 100 may be further omitted, so that the size may be reduced, the manufacture may be simplified, and the costs may be saved. The material of the transparent insulating layer 5 may be an organic transparent insulating material, in particular, PMMA. The thickness range is 100-300 μm, for instance about 200 μm. PMMA has very excellent transmittance for light, has almost no influence on the transmission of the light of the display. Further, it also has relatively low cost, good insulating ability, mechanical strength, corrosion resistance and workability, and is very suitable for being used as the material for the transparent insulating layer of the present disclosure.

The field-induced visibility-controlling layer 200 consists of two transparent conductive layers 2, 4 and an electrolyte layer 3 sandwiched therebetween.

The transparent conductive layer 2 or 4 serves as the wall of the container containing the electrolyte, and meanwhile it is connected to a voltage source and serves as an electrode plate. The transparent conductive layer 4 also serves as a substrate for forming the mirror layer. The transparent conductive layer 2 or 4 may be made of ITO (indium tin oxide), FTO (fluorine-doped tin oxide), AZO (aluminum zinc oxide), silver nanowires, etc. Among them, ITO is used in one embodiment.

The chemical composition of the electrolyte layer 3 provides the function of switching the state. In the electrolyte layer 3, silver nitrate may be used as the silver ion-containing inorganic salt. Addition to tetra-n-butylammonium bromide, sodium bromide, potassium bromide and dimethylbromosulfonium bromide may also be used as the brominating agent. Copper chloride may be used as the catalyst. Dimethyl sulfoxide (DMSO) may be used as the organic solvent.

In one embodiment, the composition of the electrolyte layer 3 is as follows. $AgNO_3$ has a concentration of 40-60 mM, TBABr has a concentration of 200-300 mM, and $CuCl_2$ has a concentration of 8-12 mM. In one embodiment, a method for formulating the electrolyte is dissolving 2.5 mmol TBABr, 0.1 mmol $CuCl_2$ and 0.5 mmol $AgNO_3$ in 10 mL DMSO. PVB may also be added to the above-mentioned mixture. This formulation meets the following requirements at the same time: relatively low voltage, sufficient transparency in the transparent state, sufficient reflecting ability in the mirror state, sufficiently short switch time, etc.

The periphery of the electrolyte layer 3 and the gap between the transparent conductive layers 2, 4 are sealed by a sealant. The sealant may be a resin, or the like.

In the configuration of the above-mentioned embodiment, thicknesses of the respective layers may be as follows. The transparent conductive layer 2 or 4 has a thickness of 80-120 nm, for instance about 100 nm, and the electrolyte layer 3 has a thickness of 400-600 μm, for instance about 500 μm.

Figure 2:
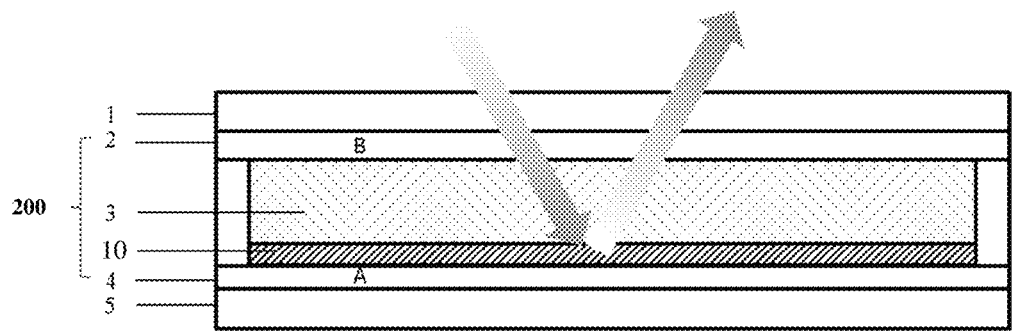
FIG. 2 shows a structure of an example of a display apparatus of the disclosure, which is in a mirror state.
Figure 3:
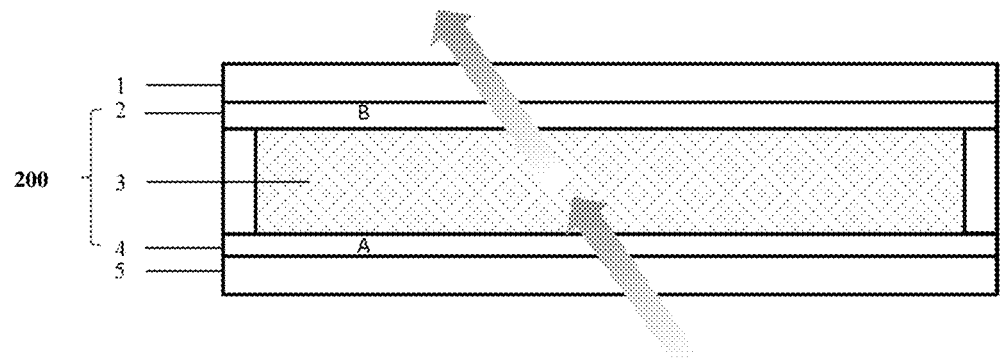
FIG. 3 shows a structure of an example of a display apparatus of the disclosure, which is in a transparent state.

The operating principle of the above-mentioned display apparatus is illustrated as follows. As shown in FIG. 2 and FIG. 3, the transparent conductive layer 4 (or transparent conductive layer A) is electrical grounded, and when a positive voltage is applied to the transparent conductive layer 2 (or transparent conductive layer B), the silver ion-containing inorganic salt in the sol electrolyte layer is subjected to the reduction reactions as shown in formulae (1) and (2), under the action of the electrical field:

$$Ag^+ + nBr^- \rightarrow AgBr_n^{1-n} \qquad (1)$$

$$AgBr_n^{1-n} + e^- \rightarrow Ag + nBr^- \qquad (2)$$

The external power provides the electron ($e^-$), and the brominating agent provides $Br^-$, and the $Ag^+$ therein is reduced to metal Ag nanoparticles, which are deposited on the flat inner side of the transparent conductive layer 4 and form a smooth mirror 10, which has high reflectivity against light, as shown in FIG. 2. At the same time, the light of the liquid crystal display cannot pass the field-induced visibility-controlling layer 200. Now the field-induced visibility-controlling layer 200 is in the mirror state.

When the voltage applied on the transparent conductive layer B is negative, the electrical field is reversed. Metal Ag is subjected to oxidation reaction, and loses electrons ($e^-$). The metal Ag layer formed by electrodeposition is decomposed and forms $Ag^+$ dispersed into the sol electrolyte. At this time, the field-induced visibility-controlling layer 200 turns back to the transparent state, which has high transmittance and allows light to pass, as shown in FIG. 3.

The state of the field-induced visibility-controlling layer 200 is controlled by voltage. In the case that no voltage is applied, the field-induced visibility-controlling layer 200 is in the stable transparent state. In order to keep the field-induced visibility-controlling layer 200 in a mirror state, a sustained positive voltage is needed to be applied. When the positive voltage is removed, the field-induced visibility-controlling layer 200 will gradually turn back to the transparent state from the mirror state. In order to switch the mirror state to the transparent state more rapidly, a negative voltage can be applied appropriately, so that the field-induced visibility-controlling layer 200 becomes transparent more rapidly.

The voltage during the time period of switching the states (for example, switching from the transparent state to the mirror state) and the voltage during the time period of keeping the state (for example, keeping in the mirror state) may be different. When switching to the mirror state, a relatively high voltage is applied, so that the deposited silver layer continuously becomes thicker. Once the silver layer is thick enough for a reflective mirror, it is not necessary to apply said relatively high voltage, and a relatively lower voltage may be applied instead, to keep the deposition balance of silver, thereby saving energy.

Additionally, when the mirror state is switched to the transparent state, if a negative voltage is applied, once the silver layer has been ionized, further application of the negative voltage will result in the formation of silver layer on the other transparent conductive layer. Therefore, it is needed to control the negative voltage.

No matter which kind of voltage control is used, the applied voltage should not be too high, and meanwhile, for applicability purpose, it should be ensured that it takes relatively short time for the switch between the states of the field-induced visibility-controlling layer 200. In one embodiment, the voltage during the switch from the transparent state to the mirror state is 1-4 V, and the switch time is 2 s or less; and the voltage during the switch from the mirror state to the transparent state is −1--4 V, and the switch time is 2 s or less. In another embodiment, the absolute value of the switch voltage is less than 2V. Then, the energy required during the switch is relatively low, the current required for keeping the transparent state or the mirror state is relatively small, and the power consumption is relatively low.

Figure 5:
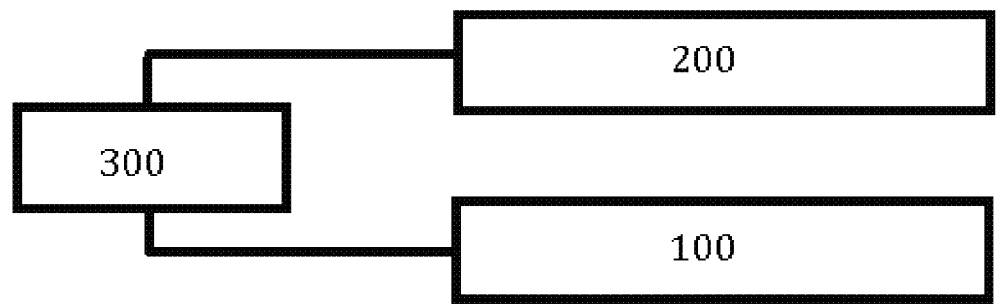
FIG. 5 is a schematic drawing of an example of a display apparatus having a control means of the disclosure.

Advantageously, the display apparatus has a control means 300 allowing the on/off state of the display 100 correspondingly match the transparent/mirror state of the field-induced visibility-controlling layer 200, as shown in FIG. 5.

This purpose may be achieved by various manual or automatic control devices, for example, a control device automatically turning off or turning on the display 100 according to the mirror state or the transparent state of the field-induced visibility-controlling layer 200; or a control device automatically applying an appropriate voltage to change the field-induced visibility-controlling layer 200 into the mirror state or the transparent state when the display 100 is turned off or turned on; or a circuit, which is designed to manually switch the states of the display 100 and the field-induced visibility-controlling layer 200 at the same time by same switch in a one-touch manner. It should be understood that the above examples of the manual or automatic control device are only for illustration, but not for purpose of limitation.

For example, when the state is switched to the mirror-displaying state, the liquid crystal display panel and the backlighting module may be shut down, and only the field-induced visibility-controlling part is turned on. This can save energy.

The state of the field-induced visibility-controlling layer 200 can be automatically adjusted by controlling the voltage, by means of a combination of a sensor, a data processor and the like.

Figure 6:
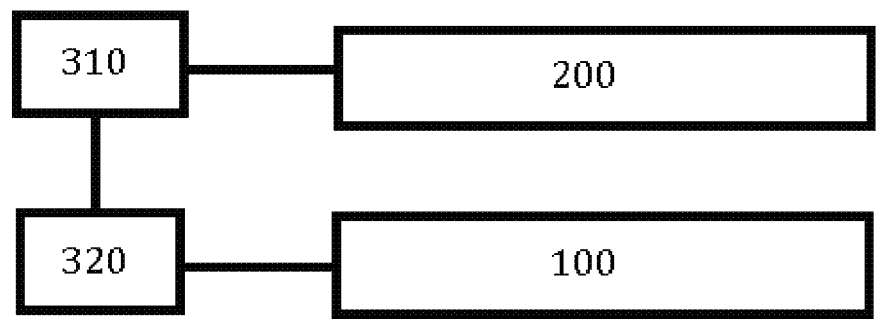
FIG. 6 is a schematic drawing of one embodiment of the display apparatus of FIG. 5.

FIG. 6 shows a specific exemplary embodiment, in which the control means 300 may comprise a control module 310 for field-induced visibility-controlling layer and a sensing module 320. The control module 310 for field-induced visibility-controlling layer is set, which module may control the field-induced visibility-controlling layer 200 according to an input signal. The control module 310 for field-induced visibility-controlling layer and a circuit driver of a liquid crystal display module is connected by the sensing module 320, which can sense the working voltage of the liquid crystal display module, and input it as the input signal to the control module 310 for field-induced visibility-controlling layer. When the working voltage VDD of the liquid crystal display module is a normal working voltage (2.3V-6V), the input to the control module 310 produces a corresponding signal 0; and when the liquid crystal display module stop working, i.e. when VDD is 0, the input to the control module 310 produces a corresponding signal 1. The control module 310 for field-induced visibility-controlling layer sends the turn-on signal 1 and the turn-off signal 0 (corresponding to turning on the mirror state and returning to the transparent state respectively) to the power-controlling part of the field-induced visibility-controlling layer 200. Thus, when the liquid crystal display module is shut down, the mirror state of the field-induced visibility-controlling layer 200 is automatically turned on by the sensing apparatus; and when the liquid crystal display module is turned on, the transparent state of the field-induced visibility-controlling layer 200 automatically comes back by the sensing apparatus.

On example of the display apparatus of the disclosure is an interior rearview mirror in a vehicle. As an interior rearview mirror, the display 100 in the display apparatus displays image coming from the camera, which is installed at rear of the vehicle, for example, outside the rear windscreen. For the application of interior rearview mirror, it is advantageous that when the field-induced visibility-controlling layer 200 of the display apparatus is in the mirror state, the camera and the circuit associated with the display are shut off meanwhile, to save electric energy.

The present disclosure is illustrated in more details by the following examples.

EXAMPLE 1

Production of Display Apparatus

A display apparatus was produced by steps of:
1) covering a glass substrate on a liquid crystal display module having a size of 7-8 inches with a layer of PMMA insulating layer 5 of 200 μm, by a sol-gel process;

2) producing two ITO transparent conductive layers (transparent conductive layer 2 and transparent conductive layer 4) each having a thickness of 400-600 nm on the PMMA insulating layer 5 and on the upper substrate 1 by magnetron sputtering respectively, and extracting out electrodes;

3) dissolving 2.5 mmol TBABr, 0.1 mmol $CuCl_2$ and 0.5 mmol $AgNO_3$ in 10 mL DMSO, and adding PVB having a mass fraction of 10% into the formulated electrolyte, to make it come to a gel state;

4) assembling the upper substrate 1 coated with ITO transparent conductive layer 2, the display module coated with PMMA insulating layer 5 and ITO transparent conductive layer 4, and DMSO-based electrolyte in the gel state, to form a field-induced visibility-controlling layer 200 having a sandwich structure.

A display apparatus switchable freely between a display state and the mirror state was formed by the above-mentioned steps.

EXAMPLE 2

Use Example

The display apparatus produced in Example 1 was used. When no voltage was applied, the field-induced visibility-controlling layer 200 is in the stable transparent state. The transparent conductive layer 4 (or transparent conductive layer A) was grounded, and a positive voltage of 1-3 V was applied to the transparent conductive layer 2 (or electrode B), and after a time of less than 2 s, the field-induced visibility-controlling layer 200 was in the mirror state, as shown in FIG. 2. At that time, the display apparatus was a mirror for an observer, and the display 100 behind the field-induced visibility-controlling layer 200 could not be observed.

When the positive voltage was removed, the field-induced visibility-controlling layer 200 gradually and slowly turned back to the transparent state from the mirror state, as shown in FIG. 3.

In order to keep the mirror state, a positive voltage of 1-3 V was needed to be applied.

In order to make the mirror state turn to the transparent state more rapidly, a negative voltage of −1--3 V was applied, and after a time of less than 2 s, the field-induced visibility-controlling layer 200 was in the transparent state again. Once the field-induced visibility-controlling layer 200 was in the transparent state, the application of voltage was stopped immediately, in order to prevent deposition of silver on the transparent conductive layer 2 (the B side).

What is claimed is:

1. A display apparatus, comprising:
   a display;
   a field-induced visibility-controlling layer provided on a light-outgoing side of the display,
   wherein the field-induced visibility-controlling layer can be switched between a transparent state through which the display is visible and a mirror state by which the display is shielded, according to a voltage applied; and
   a control means allowing the on/off state of the display to correspondingly match the transparent/mirror state of the field-induced visibility-controlling layer,
   wherein the control means comprises a control module for field-induced visibility-controlling layer and a sensing module, and the control module and a circuit driver of a liquid crystal display module are connected by the sensing module, wherein the sensing module is configured to sense a working voltage of the liquid crystal display module and input it as an input signal to the control module, and the control module is configured to control the field-induced visibility-controlling layer according to the input signal.

2. The display apparatus according to claim 1,
   wherein the field-induced visibility-controlling layer comprises two transparent conductive layers and an electrolyte layer sandwiched therebetween; and
   wherein the field-induced visibility-controlling layer is switched between the transparent state and the mirror state by applying different voltages to the electrolyte layer through the two transparent conductive layers.

3. The display apparatus according to claim 1, further comprising a transparent insulating layer provided between the display and the field-induced visibility-controlling layer.

4. The display apparatus according to claim 3, wherein the transparent insulating layer has a thickness of 100-300 μm.

5. The display apparatus according to claim 3, wherein the transparent insulating layer is made of polymethyl methacrylate.

6. The display apparatus according to claim 2, wherein the electrolyte layer is a sol formed by dissolving a silver ion-containing inorganic salt, a brominating agent and a catalyst in an organic solvent.

7. The display apparatus according to claim 6, wherein the silver ion-containing inorganic salt is $AgNO_3$, the brominating agent is tetra-n-butylammonium bromide, sodium bromide, potassium bromide or dimethylbromosulfonium bromide, the catalyst is $CuCl_2$, and the organic solvent is DMSO.

8. The display apparatus according to claim 7, wherein $AgNO_3$ has a concentration of 40-60 mM, the brominating agent has a concentration of 200-300 mM, and $CuCl_2$ has a concentration of 8-12 mM.

9. The display apparatus according to claim 6, wherein the electrolyte layer further comprises polyvinyl butyral.

10. The display apparatus according to claim 2, wherein the electrolyte layer has a thickness of 400-600 μm.

11. The display apparatus according to claim 2, wherein the transparent conductive layer is made of tin indium oxide, fluorine-doped tin oxide, aluminum zinc oxide or silver nanowires.

12. The display apparatus according to claim 2, wherein the transparent conductive layer has a thickness of 80-120 nm.

13. The display apparatus according to claim 1, wherein the voltage for switching from the transparent state to the mirror state is 1V to 4 V and the switch time is 2 s or less;
    the voltage for switching from the mirror state to the transparent state is −1V to −4V and the switch time is 2 s or less.

14. The display apparatus according to claim 1, wherein the control means includes:
    a control device automatically turning off or turning on the display according to the mirror state or the transparent state of the field-induced visibility-controlling layer; or
    a control device automatically applying an appropriate voltage to change the field-induced visibility-controlling layer into the mirror state or the transparent state, in response of the off or on state of the display; or
    a circuit, which can manually switch the states of the display and the field-induced visibility-controlling layer at the same time by same switch in a one-touch manner.

15. The display apparatus according to claim 1, wherein the display apparatus is an interior rearview mirror.

16. The display apparatus according to claim 15, wherein in the interior rearview mirror, the mirror is not parallel to the light-outgoing surface of the display, such that a driver can observe an environment behind the vehicle via the mirror.

17. The display apparatus according to claim 2, further comprising a transparent insulating layer provided between the display and the filed-induced visibility-controlling layer.

* * * * *